United States Patent [19]

Hartmann

[11] Patent Number: 4,487,792
[45] Date of Patent: Dec. 11, 1984

[54] PREFORMS FOR REINFORCEMENT OF BATTERY GRIDS

[75] Inventor: Hans S. Hartmann, Wilmington, Del.

[73] Assignee: E. I. Du Pont de Nemours and Company, Wilmington, Del.

[21] Appl. No.: 390,538

[22] Filed: Jun. 21, 1982

[51] Int. Cl.³ ............................................. B32B 5/12
[52] U.S. Cl. .................................. 428/105; 428/108; 428/109; 428/114; 428/198; 429/233; 429/234; 429/237; 156/166; 156/296
[58] Field of Search ............... 428/105, 108, 109, 114, 428/198; 429/233, 234, 237; 156/296, 73.5, 166

[56] References Cited

U.S. PATENT DOCUMENTS

| | | | |
|---|---|---|---|
| 2,765,692 | 4/1955 | Petterson | 428/198 |
| 3,632,460 | 1/1972 | Palfreyman et al. | 156/175 |
| 3,734,812 | 5/1973 | Yazawa | 428/109 |
| 3,813,300 | 5/1974 | Shima et al. | 429/234 |
| 3,828,839 | 8/1974 | Dhingra | 164/97 |
| 3,950,584 | 4/1976 | Bramley | 428/198 |
| 4,282,922 | 8/1981 | Hartmann | 164/97 |
| 4,395,449 | 7/1983 | Duffy | 428/198 |

FOREIGN PATENT DOCUMENTS

| | | | |
|---|---|---|---|
| 879329 | 11/1942 | France | 428/198 |
| 1181142 | 1/1959 | France | 428/198 |
| 1567328 | 5/1980 | United Kingdom | 428/109 |

OTHER PUBLICATIONS

Research Disclosure, p. 71, Jun. 1977, "Application for Aramids."
Trade Literature—ICI "Saffil" Alumina Fibre.

Primary Examiner—Mary F. Downey
Assistant Examiner—James J. Seidleck

[57] ABSTRACT

Network preforms for battery grids are prepared from cross-lapped assemblages of spaced bundles of inorganic filaments which are bonded at crossover points.

6 Claims, 2 Drawing Figures

PREFORMS FOR REINFORCEMENT OF BATTERY GRIDS

BACKGROUND OF THE INVENTION

This invention relates to improved techniques for battery grid manufacture. Lead-acid batteries and their operation are well-known. The grids are the support for the active material of the plates and conduct the current to and from the active materials. The grid must be corrosion resistant and must possess sufficient strength and stiffness to prevent damage or distortion during manufacture of the grids, preparation of the plate from the grid and construction of the battery itself. Pure lead is the most corrosion resistant material for lead-acid battery grids, but it is weak and tends to creep. In use, the grids are subject to stress due to their own weight and the weight of active material supported by the grids and the stresses imposed through expansion and contraction of the active material in the charge-discharge cycle. If the grids are deformed during use, the active material is isolated or shed and lost for the electrochemical reaction. From the standpoint of economies of weight, cost and cell capacity, grid thickness is also a significant factor.

Battery grids are generally made by a casting process. The grid-casting machine consists of a book or center-parting grid mold, trimming mechanism and melting pots. The grid mold consists of two cast iron parts, each with a grid design for a face. The mold is heated before introduction of the molten metal in order to avoid premature solidification. The lead or lead alloy is first melted in the melting pots and transported to the grid mold. After the mold is filled with molten metal, it is allowed to cool. It is then opened, the cast grid is removed and the operation begins anew for fabrication of the next grid. This is done on a mass production schedule and it is important that no undue delay occurs in the cycle.

Alloys are generally used as the preferred grid material because pure lead is easily deformed. The proper selection of the lead alloy depends on the intended use and economics of the lead-acid battery application because the alloys generally introduce other problems such as cost, corrosion, difficulties in manufacture or reduced battery life.

Reinforcement of grids is a relatively new concept and shows promise of resolving many of the problems mentioned above. Efforts to use fiber to reinforce the grid structure have been found to present problems in manufacture. Hand lay-up of filaments in the open casting mold is a time-consuming operation that is inconsistent with mass production techniques. Also, conditions around the grid casting area are not conducive to careful hand lay-up of the filaments. In some cases handling of the filaments causes discontinuities and breaks. When this occurs in the casting mold, it results in poor quality grids. The instant invention offers a solution to these problems.

SUMMARY OF THE INVENTION

This invention provides a network sheet preform for reinforcement of a lead or lead alloy battery grid comprising an array of spaced bundles of inorganic filaments superimposed upon and directionally displaced from another array of spaced bundles of inorganic filaments, said arrays being bonded to each other at the filament bundle crossover points. The spaced bundles in each array are preferably essentially parallel to each other. Also provided is a method for making reinforced lead or lead alloy battery grids comprising placing the preform into the casting mold, closing the mold, heating the mold and its contents to a temperature at least as high as the melting point of the lead or lead alloy, drawing a vacuum on the mold cavity and introducing molten lead or lead alloy to infiltrate the filament bundles and fill the mold, cooling the mold to solidify the lead or lead alloy, opening the mold and removing the reinforced grid.

DETAILED DESCRIPTION OF THE INVENTION

Figure 1:
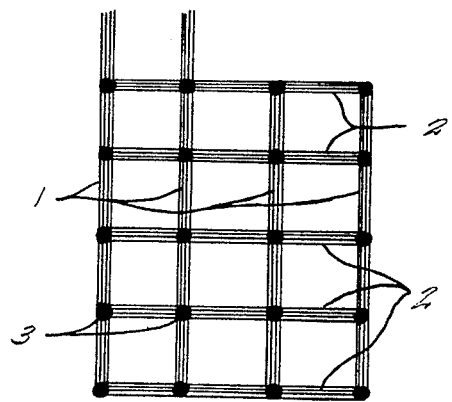
FIG. 1 is a schematic of a preform.

The preform of the invention corresponds in configuration to the battery grid and comprises a sheet structure wherein an array or assemblage of spaced bundles of inorganic filaments lying in a single plane is bonded at crossover points to a cross-lapped array of spaced bundles of inorganic filaments. FIG. 1 is a schematic of such a preform in which assemblage 1 of essentially parallel bundles of inorganic filaments overlaps assemblage 2 of essentially parallel bundles of inorganic filaments and is attached thereto at crossovers through bonds 3. The spacing of filament bundles and the size and shape of the preform are selected so that the preform can be readily inserted in the grid casting mold with the filamentary bundles resting in the mold depressions forming the X and Y direction bars of the grid to be cast. Normally the X and Y bar directions are perpendicular.

The filament bundles of the preform should be made up of inorganic high temperature resistant fibers. In this class are glass, graphite and alumina fiber. The bundles are preferably untwisted or only slightly twisted and should bear little or no finish oils. It is preferred to use alumina fiber and still more preferred to use the lead coated fiber described in Hartmann U.S. Pat. No. 4,282,922 because of the fact that it is more easily wettable by lead or lead alloys. A useful range of reinforcement for the grid is from 1 to 25 volume percent, preferably from 2 to 8 volume percent.

A great variety of materials can be used to bond intersecting filament bundles at crossover points. It is preferred that little or no residual foreign matter remain in the battery grid, that is, the grid should consist essentially of lead or lead alloy and the inorganic fiber. Organic residues are particularly undesirable because they interfere with the wetting of the inorganic fiber by the lead or lead alloy. A lead paste of lead powder and water has been found useful when applied at the crossovers and heated to melt the lead which then bonds the intersecting yarns as the lead solidifies. Lead foil may be used to tie the bundles at crossovers and then heat applied to fuse the lead and create the bond. Dispersions of lead containing glass as described in the aforementioned Hartmann patent may be deposited at the crossovers and then heated with a reducing flame to fuse the glass and to provide a lead coating.

Figure 2:
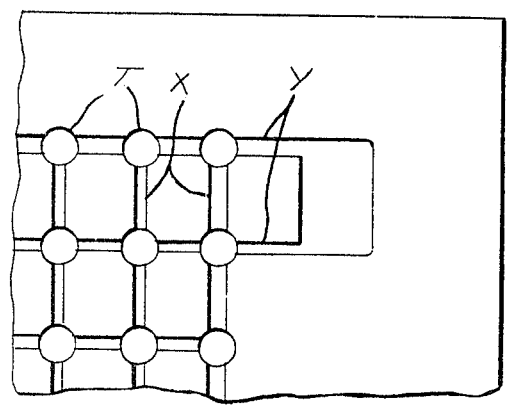
FIG. 2 is a schematic of a section of a preform fixture.

FIG. 2 represents a fixture which may be used to prepare the preform. It is not the same as the mold which is used for casting the battery grid. It may be formed from plastic, ceramic, metal or other convenient material depending on the bonding material to be used. As shown, it has X- and Y-direction parallel grooves and holes through the fixture at intersections T of the grooves. The purpose of the holes will be described in detail in the Example 1 which follows. In practice, the filament bundles or yarns are laid up by hand or mechanically in the X-direction grooves of the fixture and then in the Y-direction grooves. An assemblage of parallel filament bundles may be prepared in a dispensing cartridge and fed to the fixture directly from the cartridge as a group of bundles. Conveniently the overall configuration of the preform fixture corresponds to that of the battery grid casting mold. The group of X-direction filament bundles are then bonded to the group of Y-direction filament bundles at crossover points to form an integral structure and the preform is removed from the fixture.

Another method of bonding involves the use of ice as taught in the concurrently filed and coassigned patent application to J. J. Duffy. After the filamentary bundles are deposited in the preform fixture, water may be introduced to wet the filament bundles. Alternatively, wet filament bundles are laid in the grooves of the preform fixture. In either case, the water on the fiber array is frozen and the ice serves to bond filamentary bundles at crossover points. The preforms are removed and kept frozen until used.

The preforms are next taken to the battery grid casting area and placed in the open molds which are then closed. While symmetrical center parting molds are common in the industry, an asymmetric mold with the grooves in one side deeper than those on the other will be useful with heavier preforms. The casting molds are heated as mentioned previously to prevent premature solidification of the molten metal which is subsequently introduced. A vacuum is then applied to exhaust gases from the mold cavity. Any water or steam flashing off from the ice can escape in a similar manner. Molten lead or lead alloy is then introduced into the mold and allowed to solidify by cooling. Application of vacuum has been found to facilitate infiltration of the fiber bundles by the molten metal. Pressure may also be applied to assist infiltration. The mold is then cooled to solidify the molten metal, opened and the battery grid removed making the mold ready to receive the next preform.

The following example is illustrative of the invention and is not intended to limit it in any way.

EXAMPLE I

From a bobbin of 800 filament (about 20 microns per filament) lead coated alumina yarn such as described in U.S. Pat. No. 4,282,922, lengths were cut to place one yarn end in each cavity of the fixture shown in FIG. 2, then placed into the fixture first in one direction and then in the other. A dollop of lead/water paste was then placed at each crossover point. Using an oxyacetylene torch with a neutral flame, each dollop of paste was melted from beneath the fixture through the holes referred to in the earlier description and allowed to cool which fused the many separate yarn bundles into a readily handled preform similar to that of FIG. 1, having a geometric pattern matching that of the grid casting mold. This preform was then placed into the casting mold, the mold sections closed, clamped and then preheated by submerging the mold into a pot of molten lead. During the preheat cycle, a vacuum was drawn on the mold cavity to evacuate air and moisture. Lead was then admitted to the mold cavity by removing a plug in a tube entering the bottom of the vertically positioned mold. A freeze plug positioned in the vacuum line stops lead flow when the mold is full. The mold is then removed from the lead pot and transferred to a cooling station where a water spray is used to expedite cooling. The cast grid is then removed from the mold. The gate and riser are then trimmed, completing the fabrication process.

EXAMPLE II

Lead coated yarn similar to that used in Example I was moved from a bobbin through a water bath thoroughly wetting the fiber bundle. The yarn was cut to the length of each cavity of a freezing fixture shown in FIG. 2, then placed into the fixture first in one direction and then in the other. The wet fiber in its fixture was then frozen by passing a cold gas over the fiber array or by fogging the fiber array with a stream of solid carbon dioxide particles from a high pressure cylinder. The preform was removed from the fixture by moving ejector pins through the holes in the fixture at the crossover points, freeing the unitary preform. It was then kept in a freezing chamber for storage. This preform geometry matched that of the lead casting mold. This preform was later placed into the casting mold, the mold halves closed, clamped and then preheated in an oven. During the preheat cycle, a vacuum was drawn on the mold cavity to evacuate air and moisture. The mold was then submerged into a pot of lead. Lead was admitted to the mold cavity by removing a plug in a tube entering the bottom of the vertically positioned mold. A freeze plug positioned in the vacuum line stopped lead flow when the mold was full. The mold was then removed from the lead pot and transferred to a cooling station where a water spray was used to expedite cooling. The cast grid was then removed from the mold. The gate and riser were then trimmed, completing the fabrication process.

I claim:

1. A network sheet preform for reinforcing a lead or lead alloy battery grid comprising an array of spaced bundles of inorganic filaments superimposed upon and directionally displaced from another array of spaced bundles of inorganic filaments, said arrays being bonded to each other at filament bundle crossover points through lead bonds.

2. The preform of claim 1 wherein the inorganic filaments are alumina fibers.

3. The preform of claim 1 wherein the filament bundles in each array are essentially parallel and the arrays are perpendicular to each other.

4. A method for making a preform for reinforcing a lead or lead alloy battery grid, comprising depositing bundles of inorganic filaments in the grooves of a fixture having a group of grooves intersecting another group of grooves, forming a lead bond at each crossover point thereby bonding the groups of filamentary bundles into an integral structure and removing the preform from the fixture.

5. The method of claim 4 wherein the lead bond is formed by depositing a lead paste on the crossover points, melting the lead and permitting it to solidify.

6. The method of claim 4 wherein the lead bond is formed by depositing a lead containing glass dispersion on the crossover points and heating with a reducing flame to fuse the glass and to provide a lead coating.

* * * * *